United States Patent [19]
Ruland et al.

[11] Patent Number: 5,927,997
[45] Date of Patent: Jul. 27, 1999

[54] ELASTOMERIC CONTACT

[75] Inventors: Anders Ruland, Malmö; Claes von Schéele, Södra Sandby; Gert Nilsson, Sjöbo; Göran Pehrsson, Malmö; Johan Uggmark, Lund, all of Sweden

[73] Assignee: Telefonaktiebolaget LM Ericsson, Stockholm, Sweden

[21] Appl. No.: 08/858,370

[22] Filed: May 19, 1997

[30] Foreign Application Priority Data

May 31, 1996 [SE] Sweden ................................. 9602153

[51] Int. Cl.⁶ ....................................................... H01R 39/00
[52] U.S. Cl. ............................... 439/31; 439/86; 361/681
[58] Field of Search ............................... 439/65, 188, 66, 439/86, 91, 37, 365; 361/680, 681, 683, 686

[56] References Cited

U.S. PATENT DOCUMENTS

| | | | |
|---|---|---|---|
| 4,257,661 | 3/1981 | Dalamangas et al. | 439/91 |
| 4,344,662 | 8/1982 | Dalamangas et al. | 439/91 |
| 4,522,378 | 6/1985 | Nelson | 207/141.4 |
| 4,743,746 | 5/1988 | Murschall et al. | 235/486 |
| 5,117,073 | 5/1992 | Mischenko | 200/61.7 |
| 5,395,248 | 3/1995 | Kinoshita et al. | 439/31 |

FOREIGN PATENT DOCUMENTS

| | | |
|---|---|---|
| WO84/01984 | 5/1984 | WIPO . |
| WO95/13665 | 5/1995 | WIPO . |
| WO96/21988 | 7/1996 | WIPO . |

OTHER PUBLICATIONS

International –Type Search Report corresponding to National Application No. SE 9602153–0, mailed Dec. 12, 1996.

*Primary Examiner*—Neil Abrams
*Assistant Examiner*—T C Patel
*Attorney, Agent, or Firm*—Burns, Doane, Swecker & Mathis, L.L.P.

[57] ABSTRACT

The present invention relates to a device for connecting two electrical circuits (2,17;15,16) by a connection which permits that the two circuits easily can be separated and reunited again at the same time as interference and scratching noise in the connection mechanism are avoided. A first carrier (14, 28) is movable around a shaft (1), which is fastened onto a second carrier (7, 29). The first carrier (14, 28) can easily be removed from the shaft (1) and refitted again. The first carrier (14, 28) has a projecting part (8, 23, 30), which presses against an electrically conducting elastomer (4,18a–l, 21, 33) localized on the second carrier (7, 29). On the projecting part (8, 23, 30) there is an electrically conducting part (9, 20a–l, 24a–h), which is connected to a first electrical circuit (2,17) localized on the first carrier (14, 28). The electrically conducting elastomer (4,18a–l, 21, 33) is connected to a second electrical circuit (15,16) localized on the second carrier (7, 29). By means of co-operation between the projecting part (8, 23, 30) and the elastomer (4,18a–l, 21,33), an electrical connection between the first (2,17) and the second circuit (15,16) is achieved.

25 Claims, 3 Drawing Sheets

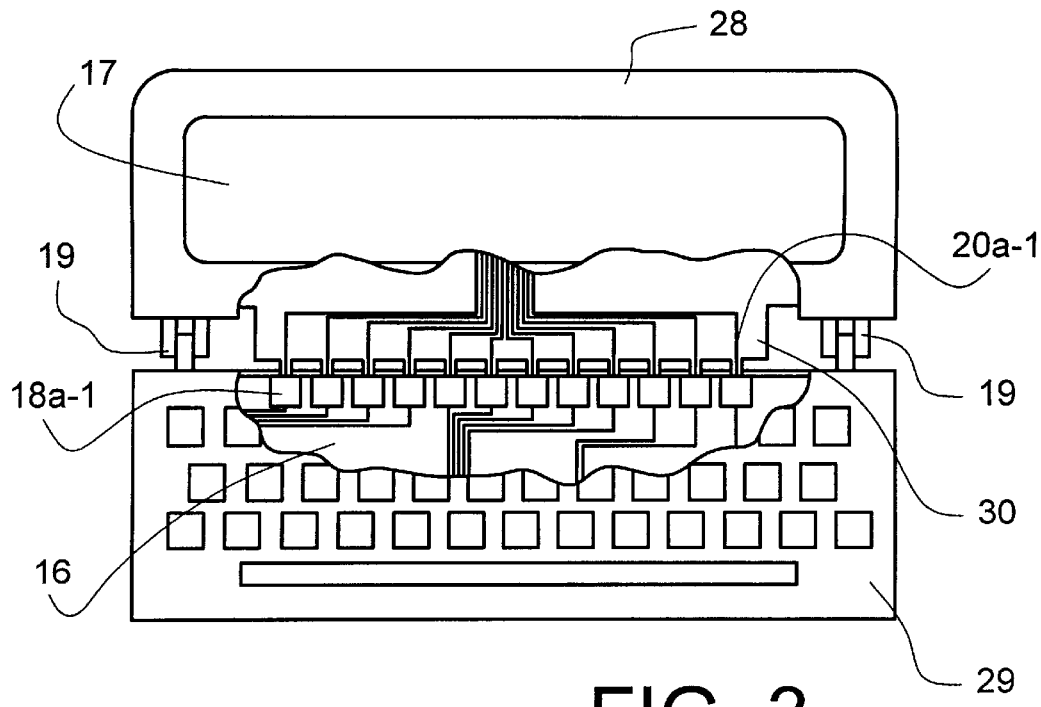
FIG. 3
FIG. 4
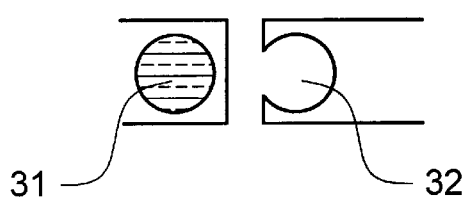
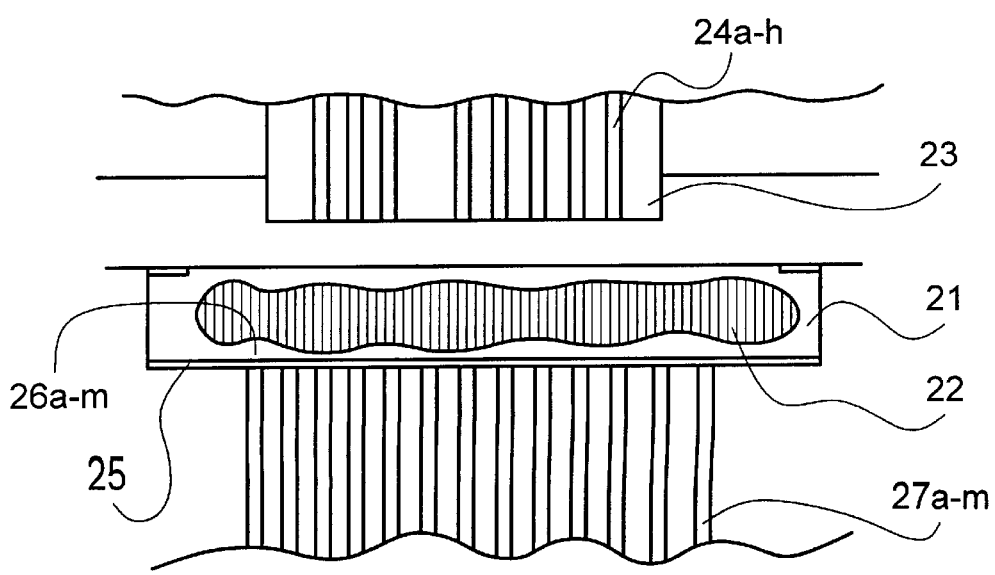
FIG. 5

ELASTOMERIC CONTACT

TECHNICAL FIELD

The present invention relates to a device and a method for electrically connecting two electrical circuits which are movable and separable in relation to each other.

STATE OF THE ART

In the consumer electronic industry as well as in the other parts of the electronic industry there is an abundance of products which consist of two parts which are movable in relation to, and electrically connected to, each other. As examples can be named laptop computers which have a foldable LCD screen, mobile telephones which have a foldable microphone or a movable antenna, and hand calculators which have a keyboard in a foldable part.

The purpose of movable or foldable parts is naturally to reduce the bulk of the product when it is not active.

In order to transfer power and data between the two different parts, there must be some type of electrical connection between the two parts. At present, this connection most often takes place with cables. This means that the two parts cannot be taken apart in a simple way. If there is a need that the parts should be able to be separated, then this has been solved by two metal contacts which co-operate in order to form an electrical circuit. For, for example, mobile telephones this means a problem if the two contacts are brought into motion with respect to each other. This results in a scratching noise and disturbances through the electrical resistance between the contacts changing.

The need to separate the parts occurs, for example, in connection with cleaning, production or service.

Producing products consisting of two parts which shall be connected to each other can cause problems. It is considerably simpler to produce two different units which only are coupled together at the last moment in the production chain. In order to produce two separate parts, metal contacts are used which cause the above mentioned problem with disturbances and scratching noise.

When new technical developments occur, for example, an improved microphone for mobile telephones, the owner of the obsolete technique will naturally wish to upgrade his apparatus in order to take advantage of the new technology. At the present this means that the owner must hand in his apparatus for service. This is expensive and causes inconvenience for the user because he must give up using his product during the service period.

U.S. Pat. No. 4,257,661 Retainer For Elastomeric Electrical Connector describes a holder which is used in order to achieve contact between a large-scale integrated circuit and a printed circuit board with the help of one or more electrically conducting elastomers. The integrated circuit is pressed by a lid which puts a pressure on the elastomer towards the circuit board, which in its turn forms electrical contact between the integrated circuit and the circuit board. The document describes a holder for an elastomer and is the state of the art for the use of electrically conducting elastomers for connecting two circuits. The document is, however, not relevant for said invention because it solves a different problem to that which said invention does.

U.S. Pat. No. 4,344,662 Retainer For Elastomeric Electrical Connector describes a holder for holding an electrically conducting elastomer. This document also describes a holder and solves a different problem to that which said invention does.

U.S. Pat. No. 4,522,378 Wiper Motor Mounting Grommet describes the use of an elastomer for vibration damping and WO 84/01984 Clamp Fastening describes a fastening device for good electrical and mechanical contact. These documents are not related to electrical connections with conducting elastomers.

DISCLOSURE OF THE INVENTION

The present invention tackles the above mentioned problem of obtaining easily detachable parts, which comprise electrical circuits, with electrical connections between the circuits, through the electrical connection between the circuits at least partially talking place by an electrically conducting elastomer.

Another problem which the invention tackles is to eliminate scratching noise which occurs when metal contacts are used in order to obtain a connection between the circuits and the different parts, through the electrical connection between the circuits at least partially taking place by an electrically conducting elastomer.

Another problem which the invention tackles is that products which are conducting can have a weak link, e.g. in the hinge, which relatively easily can be broken by sudden violence, for example, by falling onto a hard surface. This problem is taken care of by having a hinge which is designed so that it can easily be separated and reunited.

The invention solves the above mentioned problems by an electrically conducting elastomer, which is fastened on a second carrier which co-operates with a projecting part on a first carrier. The elastomer is made conductive through thin gold or silver wires being moulded into the elastomer. This means that the elastomer will only conduct current in the direction in which the wires run. The elastomer lies in contact with a second electrically conducting surface on the carrier which has electrical contact with the wires in the elastomer and is electrically connected to a second electrical circuit. The second electrical circuit is fastened onto the second carrier which also includes a fastening means where the first carrier can be fastened. The fastening means allows the first carrier to move, preferably along an axis. The first carrier comprises means with which the first carrier can be fastened to the fastening means of the second carrier. These means permit the first carrier to be easily removed and refastened to the fastening means of the second carrier, and that the first carrier can be held in at least a first and at least a second position. The first carrier further comprises at least one projecting part on which the outermost part has at least a first surface which is electrically connected with a first electrical circuit is situated. When the first carrier is in the second position the projecting part presses against the elastomer, which results in electrical contact between the first surface, the wires in the elastomer and the second surface. In this way an electrical connection is achieved between the first and the second electrical circuits via the electrically conducting elastomer.

Consequently, one object of the present invention is to achieve a simplified and cheaper manufacturing of products which consist of at least two active parts, which parts are in electrical connection with each other.

Another object is to prevent the occurrence of scratching noise in e.g. mobile telephones, where the microphone or loudspeaker is situated in a separate removable part.

Another object is to produce a generic interface between two units so that one unit can, in a simple manner, be exchanged for a new, more modem unit.

Another object is to simplify the servicing of the parts.

Another object is to make a more robust product, which in the case of sudden violence, e.g. a fall against a hard surface, instead of breaking at weak parts, e.g. the hinge, only divides at said hinge.

Another object is to facilitate upgrading of the parts in a simple way.

One advantage of the invention is that a simple, effective and secure connection between two active parts of a product is achieved, which means that the parts can be separated and reunited with a simple manipulation.

Another advantage is that no interferences occur in the contact between the parts.

Another advantage is that new technology can be gradually introduced by only one unit being upgraded.

The invention will now be described more closely with the help of preferred embodiments and with reference to the appended drawings.

DESCRIPTION OF THE FIGURES

FIG. 3 shows another embodiment of the invention.

FIG. 4 shows a detail of FIG. 3.

FIG. 5 shows a plane view of a third embodiment of the invention.

PREFERRED EMBODIMENTS

Figure 1:
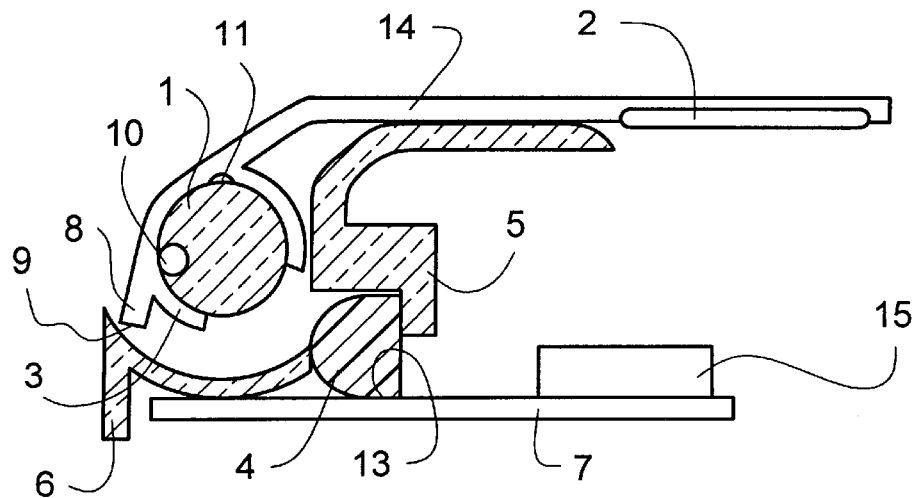
FIG. 1 shows a cross-section of an embodiment of the invention.

FIG. 1 shows a cross-section of an embodiment of the invention, more precisely a mobile telephone. A first carrier 14 with a microphone 2 is fastened to a shaft 1 by means of an open ring 3 co-operating with the shaft 1. The microphone 2 is fastened to the carrier 14, which in turn is fastened in the open ring 3. The ring 3 is made from a material which is rigid but still flexible, which allows the opening in the ring 3 to widen so that the ring 3 can be removed from the shaft 1 and be reattached again. This allows that, for example in the case of a powerful blow on carrier 14, the ring 3 and shaft 1 will not be broken but the ring 3 will only come loose from the shaft 1. An elastomer 4 is fastened between a first support 5 and a second support 6. The elastomer is electrically conducting by means of thin gold wires being cast into the elastomer. These wires are not shown in the Figures. In this embodiment the wires follow the contour of the elastomer in a horizontal U-shape. The distance between the gold wires is 0.1 mm. One can also use, for example, silver wires or some other material with good electrical conduction characteristics. The distance between the wires can naturally also vary considerably. The wires lie in a direction parallel with a second carrier 7. The elastomer will only conduct current in the direction in which the wires run. This means that the same elastomer can carry several parallel signals by the contacts being arranged in a row in a direction transverse to the direction in which the wires run. The ring 3 further comprises a projecting part 8 which on its outermost part has an electrically conducting surface 9. The surface 9 is electrically connected to the microphone 2. In FIG. 1, the carrier 14 is in its passive position without any electrical contact between the surface 9 and the elastomer 4. The elastomer 4 lies in contact with an electrically conducting surface 13, which is connected with a circuit 15, which is a part of the logic in the mobile telephone. The carrier 14 is held in this position by co-operation between magnetic contacts in the carrier 14 and the first support 5. In FIG. 1, a ball 10 is pressed into a cavity in the shaft 1. The ball 10 co-operates with a spring (not shown in the Figure) which presses the ball outwardly in the radial direction.

Figure 2:
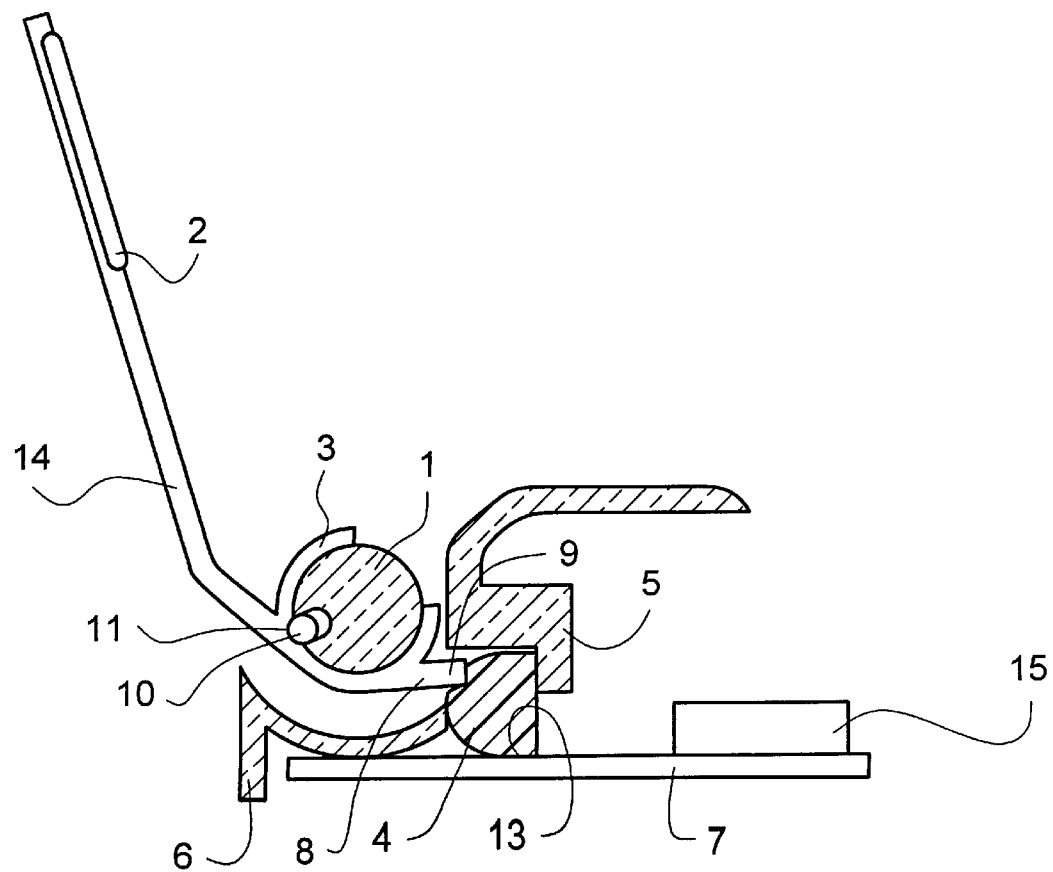
FIG. 2 shows a cross-section of the same embodiment of the invention as in FIG. 1, but in different position.

In FIG. 2, the carrier 14 is in its active position. The ball 10 co-operates with a cavity 11 in the ring 3, which allows the microphone 2 to be held in its active position.

The projecting part 8 of the ring 3 presses against the elastomer 4, which permits electrical contact to be achieved between the surface 9 and the gold wires in the elastomer 4. Because the projecting part presses against the elastomer, the elastomer 4 presses against the carrier 7. The carrier 7, on the side which is in contact with the elastomer 4, has an electrically conducting surface 13, which is electrically connected to the circuit 15. Through the elastomer 4 pressing against the carrier 7, electrical contact is also achieved between the electrically conducting surface of the carrier 7 and the gold wires in the elastomer 4. The elastomer 4 is compressed 5–15%. This compression guarantees electrical contact between the surface 9, the elastomer 4 and the surface 13 even if the projecting part 8 moves somewhat.

FIG. 3 shows a laptop computer where the connection between the computer unit 16 and the screen 17 has been made clear. In this embodiment, an elastomer 18a–l is used for each connection between the computer unit 16 and the screen 17. The screen 17 is fastened in the computer unit 16 with a fastening device 19, which is shown in cross-section and enlarged in FIG. 4. The fastening device 19 is designed in such a way that the screen 17 is easy to remove without any risk that it is insecure. This permits at a later opportunity to exchange screen 17 for a newer model with e.g. colour, higher resolution or better definition. It is of course also conceivable to upgrade the computer unit 1 but retain the screen 17. The contacts 20a–l co-operate with the elastomers 18a–l in order to achieve electrical connection between the computer unit 16 and the screen 17.

FIG. 4 shows an enlargement of the fastening device between the computer unit 16 and the screen 17 in FIG. 3.

FIG. 5 shows a plane view of one embodiment of the invention. In this embodiment, an elastomer 21 is used to convey several parallel signals. In this embodiment, an elastomer with straight wires, which run parallel with the circuit board, is used. In the Figure the elastomer has been opened so that the gold wires 22 appear. A projecting part 23 presses against the elastomer 21 so that electrical contact occurs between the electrically conductive surfaces 24a–h and the elastomer 21 and between the elastomer and the corresponding electrically conducting surfaces 26a–m situated on the side, on the support 25, which faces towards the elastomer 21. The surfaces 26a–m are in electrical contact with the conductors 27a–m. In this embodiment, the contact 23 has fewer signal conductors 24a–h than the elastomer 21 can handle. This results in that future units can have a wider signal bus for communication between the units and thereby an expanded functionality.

Figure 6:
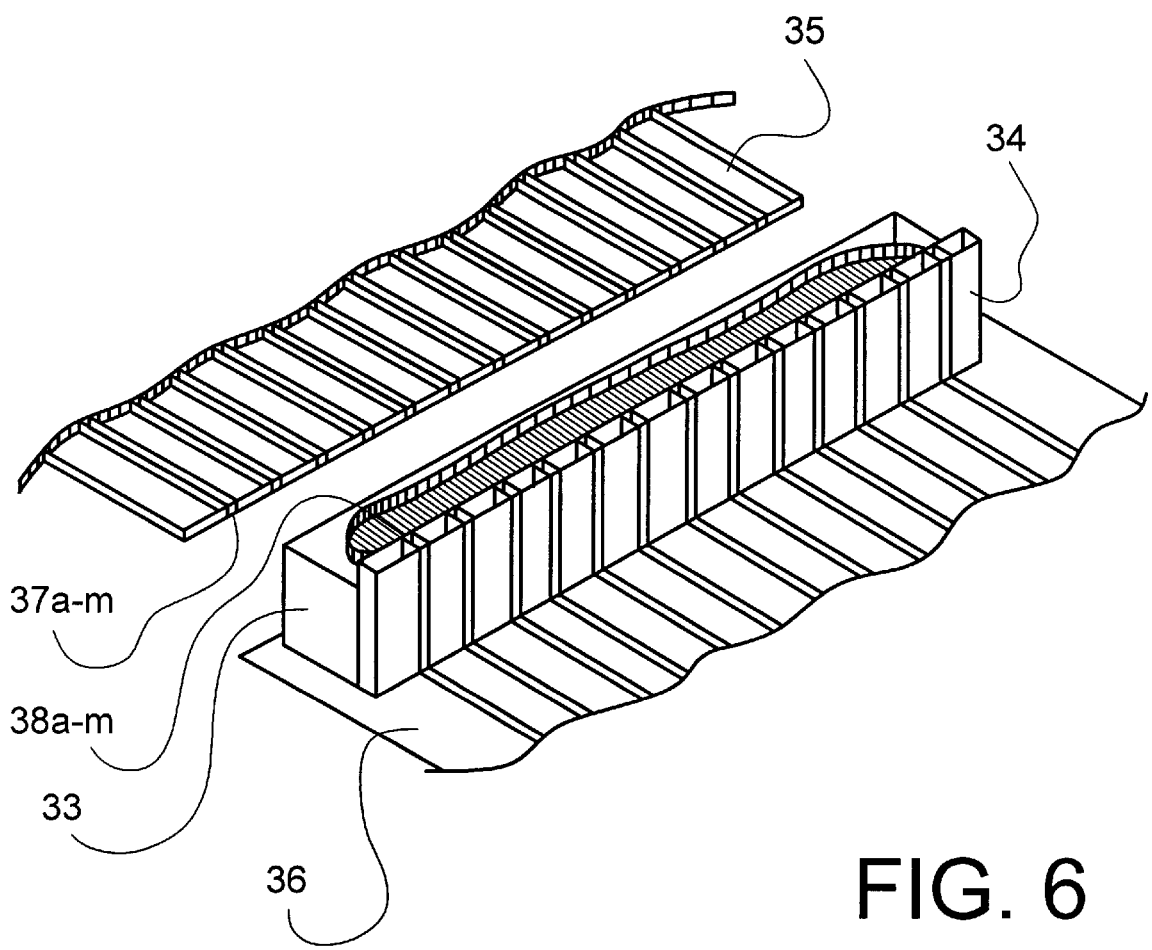
FIG. 6 shows a perspective view of a fourth embodiment of the invention.

FIG. 6 shows an isometric perspective of FIG. 5 but with a full signal bus. A projecting part 35 co-operates with the elastomer 33. The elastomer 33 presses against the support 34 so that electrical contact occurs between the surfaces 37a–m, the wires in the elastomer 33 and the surfaces 38a–m. The elastomer 33 and the support 34 are fastened onto the carrier 36.

The invention is naturally not limited to the embodiments described above and shown in the drawings, but can also be modified within the scope of the appended patent claims.

We claim:

1. A device comprising:
   at least one first electrical circuit mounted on a first carrier;
   at least one second electrical circuit mounted on a second carrier, the second carrier being fastened to the first carrier such that the first carrier is movable in relation to the second carrier from a first position to a second position, the first carrier being separable from the second carrier; and
   an electrically conductive elastomer mounted to said second carrier, said elastomer forming an electrical connection between said first circuit and said second circuit when said first carrier is moved to said second position, said first carrier having a projecting part having an electrically conductive surface for forming said electrical connection, said first circuit not being electrically connected to said second circuit via said elastomer when said first carrier is in said first position.

2. A device according to claim 1, wherein the second carrier includes an electrically conductive surface, the first carrier pressing the elastomer against the electrically conductive surface of said second carrier when the first carrier is in said second position.

3. A device according to claim 2, wherein the second carrier includes a support having said electrically conductive surface of said second carrier.

4. A device according to claim 1, wherein the first carrier is rotatably movable around a shaft in relation to the second carrier.

5. A device according to claim 1, wherein the elastomer includes molded-in gold wires.

6. A device according to claim 1, wherein the elastomer includes molded-in silver wires.

7. A device according to claim 1, wherein the first carrier includes at least one open ring with an elastic grip, the second carrier including at least one shaft, the first carrier being fastened to the second carrier by the open ring and the shaft.

8. A device according to claim 1, wherein the first electrical circuit includes a microphone, a loudspeaker, an LCD-screen, a keyboard or an antenna.

9. A device according to claim 1, wherein the second electrical circuit includes a mobile telephone or a computer unit.

10. A device according to claim 1, wherein said second electrical circuit includes an electrical component that is spaced from said electrically conductive elastomer.

11. An electrical connector assembly comprising:
    a first carrier having an electrically conductive surface and a first circuit;
    a second carrier having a second circuit, said first carrier being connected to said second carrier by a hinge connection such that the first carrier is rotatable with respect to said second carrier from a first position to a second position; and
    an electrically conductive elastomer mounted to one of said first carrier and said second carrier, said first circuit and said second circuit not being electrically connected to each other by said electrically conductive elastomer when said first carrier is at said first position, said electrically conductive surface contacting said elastomer to form an electrical connection between said first circuit and said second circuit when said first carrier is rotated to said second position.

12. The electrical connector assembly of claim 11, wherein one of said first circuit and said second circuit includes a microphone.

13. The electrical connector assembly of claim 11, wherein said first carrier and said second carrier define at least a portion of a mobile telephone.

14. The electrical connector assembly of claim 11, wherein said hinge connection between said first carrier and second carrier includes an open ring that is removably attached to a shaft.

15. The electrical connector assembly of claim 14, wherein said first carrier included said open ring.

16. The electrical connector assembly of claim 15, further comprising means for locking said first carrier in said second position.

17. The electrical connector assembly of claim 11, wherein said electrically conductive elastomer includes a plurality of conductive wires.

18. The electrical connector assembly of claim 11, wherein said second carrier includes an electrically conductive surface in contact with said electrically conductive elastomer when said first carrier is in said first position as well as when said first carrier is in said second position.

19. An electrical connector assembly comprising:
    a first member having a first electrical component and an electrically conductive surface that is electrically connected to said first electrical component;
    a second member having a second electrical component and an electrically conductive surface that is electrically connected to said second electrical component;
    an electrically conductive elastomer mounted to one of said first member and said second member, one of said first member and said second member being movable with respect to said electrically conductive elastomer from a first position to a second position, said electrically conductive elastomer being in contact with said electrically conductive surface of said first member and said electrically conductive surface of said second member when said one of said first member and said second member is in said first position, said electrically conductive elastomer being spaced from one of said electrically conductive surface of said first member and said second electrically conductive surface of said second member when said one of said first member and said second member is in said second position.

20. The electrical connector assembly of claim 19, wherein said one of said first member and said second member is rotatable about a connection between said first member and said second member.

21. The electrical connector assembly of claim 19, further comprising hinge means for permitting said first member to be removed from said second member and refastened to said second member.

22. The electrical connector assembly of claim 19, wherein said first member includes a first carrier of a mobile telephone, and said first electrical component includes at least a microphone of said mobile telephone.

23. The electrical connector assembly of claim 19, wherein said second member includes a second carrier of a mobile telephone having logic, and said second electrical component includes at least a portion of said logic of said mobile telephone.

24. An electrical connector assembly comprising:
    a first carrier having a first circuit, said first carrier having a projecting part having an electrically conductive surface electrically connected to said first circuit;
    a second carrier having a second circuit;
    an electrically conductive elastomer mounted to said second carrier and being electrically connected to said second circuit; and
    means for moving said electrically conductive surface of said first carrier with respect to said electrically conductive elastomer from a first position in which said electrically conductive elastomer is in contact with said electrically conductive surface of said first carrier to a second position in which said electrically conductive surface of said first carrier is spaced from said electrically conductive elastomer.

25. The electrical connector assembly of claim 24, wherein said first circuit includes at least one of a microphone, a loudspeaker, an LCD-screen, a keyboard, and an antenna, and said second circuit includes at least logic.

* * * * *